US011545702B2

(12) United States Patent
Kim

(10) Patent No.: US 11,545,702 B2
(45) Date of Patent: Jan. 3, 2023

(54) SUPPORT PLATE FOR PROTECTION MODULE AND BATTERY MODULE HAVING THE SAME

(71) Applicant: Samsung SDI Co., Ltd., Yongin-si (KR)

(72) Inventor: Hyun-Joong Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 479 days.

(21) Appl. No.: 15/959,021

(22) Filed: Apr. 20, 2018

(65) Prior Publication Data

US 2018/0241091 A1 Aug. 23, 2018

Related U.S. Application Data

(62) Division of application No. 14/289,576, filed on May 28, 2014, now Pat. No. 10,079,407.

(30) Foreign Application Priority Data

Aug. 14, 2013 (KR) .................. 10-2013-0096835

(51) Int. Cl.
*H01M 10/42* (2006.01)

(52) U.S. Cl.
CPC ...... *H01M 10/425* (2013.01); *H01M 2200/00* (2013.01)

(58) Field of Classification Search
CPC ................................................ H01M 10/425
See application file for complete search history.

(56) References Cited

U.S. PATENT DOCUMENTS

| 5,915,978 A | 6/1999 | Hayakawa et al. |
| 2011/0097619 A1* | 4/2011 | Park .................... H01M 10/425 429/159 |
| 2012/0115015 A1 | 5/2012 | Park et al. |
| 2014/0302353 A1* | 10/2014 | Ogura ................ H01M 50/213 429/7 |

FOREIGN PATENT DOCUMENTS

| JP | 08-171962 A | 7/1996 |
| JP | 2004-201448 A | 7/2004 |
| JP | 2006-134801 A | 5/2006 |
| JP | 2009-289431 A | 12/2009 |
| KR | 10-2011-0045476 A | 5/2011 |
| KR | 10-2012-0048259 | 5/2012 |

OTHER PUBLICATIONS

KIPO Office Action dated Jul. 28, 2016, for corresponding Korean Patent Application No. 10-2013-0096835 (13 pages).
KIPO Notice of Allowance dated Jan. 23, 2017, for corresponding Korean Patent Application No. 10-2013-0096835 (5 pages).

* cited by examiner

*Primary Examiner* — Nathanael T Zemui
(74) *Attorney, Agent, or Firm* — Lewis Roca Rothgerber Christie LLP

(57) ABSTRACT

A support plate for a protection module, and a battery module including the same. A support plate for a protection module of a battery module includes: a plate-shaped plate portion; and a support unit protruded or recessed from the plate portion and coupled to a protection member configured to control charging and discharging of a rechargeable battery, and the plate portion and the support unit are integrally formed.

20 Claims, 8 Drawing Sheets

SUPPORT PLATE FOR PROTECTION MODULE AND BATTERY MODULE HAVING THE SAME

CROSS-REFERENCE TO RELATED APPLICATION

This application is a divisional of U.S. patent application Ser. No. 14/289,576, filed May 28, 2014, which claims priority to and the benefit of Korean Patent Application No. 10-2013-0096835, filed on Aug. 14, 2013 in the Korean Intellectual Property Office, the entire content of both of which is incorporated herein by reference.

BACKGROUND

1. Field

Aspects of embodiments of the present invention relate to a support plate and, more particularly, to a support plate for a protection module and a battery module including the same.

2. Description of the Related Art

A rechargeable battery can be repeatedly charged and discharged, unlike a primary battery that is incapable of being recharged. A rechargeable battery having a low capacity may be used for a small portable electronic device, such as a mobile phone, a laptop computer, and a camcorder, and a large-capacity battery is widely used as a power source for driving a motor of a hybrid vehicle, an electric vehicle, etc.

Further, a large-capacity battery module is generally formed with a plurality of rechargeable batteries that are connected in series, and a rechargeable battery is formed in a cylindrical shape or a square shape, for example.

A protection module for measuring and controlling a voltage and a current of each rechargeable battery may be installed in a battery module. Elements for measuring currents, voltages, temperatures, and the like of the rechargeable batteries, and units for preventing or substantially preventing overcharge and overcurrent are mounted in the protection module.

For the protection module for preventing or substantially preventing overcharge and over-discharge of the battery module, it is very important to precisely measure current, voltage, and temperature. Further, various safety apparatuses are required to be mounted in the protection module. For the installation of the safety apparatuses, brackets conforming to each shape of the safety apparatuses need to be mounted in a support plate. Accordingly, a step for mounting these brackets in the support plate, a step for mounting the safety apparatuses in the brackets, and a step for mounting the support plate in the protection module are necessary. As a result, the process is complicated and working time is increased, thereby deteriorating productivity.

In addition, electrical lines connected to the support plate are complexly installed to mount the safety apparatuses in the support plate. Accordingly, tie cables or the like are used to arrange the electrical lines. However, the tie cables merely facilitate binding of the electrical lines, and it is difficult to securely fix the electrical lines to the support plate. Furthermore, such application of the tie cables is manually performed by a worker, thereby increasing working time.

The above information disclosed in this Background section is only for enhancement of understanding of the background of the described technology and, therefore, it may contain information that does not form the prior art that is already known in this country to a person of ordinary skill in the art.

SUMMARY

According to an aspect of embodiments of the present invention, a support plate for a protection module and a battery module including the same, improves productivity by reducing an assembly time.

According to an exemplary embodiment of the present invention, a support plate for a protection module of a battery module includes: a plate-shaped plate portion; and a support unit protruded or recessed from the plate portion and coupled to a protection member configured to control charging and discharging of a rechargeable battery, and the plate portion and the support unit are integrally formed.

The support unit may be protruded from the plate portion, and may have a groove by which the protection member is fixed to the support unit. The support unit may include a first support unit protruded to extend across the plate portion, and a plurality of partitions may be integrally formed in a first wall surface of the first support unit.

The first support unit may include first guide ribs separately formed on a top surface of the first support unit and upwardly protruded to accommodate electrical lines. The support unit may further include a second support unit protruded from the plate portion, and the second support unit may include a first mounting protrusion protruded from the plate portion, a second mounting protrusion protruded from the plate portion and separate from the first mounting protrusion, and a mounting groove between the first mounting protrusion and the second mounting protrusion.

The support plate may further include a second guide rib between the first support unit and the second support unit and separate from a second wall surface of the first support unit to accommodate an electrical line between the second wall surface of the first support unit and the second guide rib.

The support unit may include a third support unit recessed from the plate portion. The support plate may further include a first guide protrusion at a first side surface of the plate portion, the first guide protrusion including a first connection portion externally protruded, and a guide unit bent from the first connection portion. The first guide protrusion may include a plurality of first guide protrusions separately arranged along the first side surface of the plate portion.

The support plate may further include a second guide protrusion at a second side surface of the plate portion extended in a direction crossing the first side surface of the plate portion, the second guide protrusion including a second connection portion externally protruded, and a second guide unit bent from the second connection portion, and the first guide unit and the second guide unit may be bent in opposite directions from each other.

The support plate may further include a first guide protrusion at a first side surface of the plate portion, the first guide protrusion including a first connection portion externally protruded, a first catching jaw facing the first connection portion, and a first guide unit connecting the first connection portion and the first catching jaw. The first catching jaw may be spaced apart from the first side surface of the plate portion to form a space between the first catching jaw and the first side surface.

The support plate may further include a second guide protrusion at a second side surface of the plate portion extended in a direction crossing the first side surface of the plate portion, the second guide protrusion including a second connection portion externally protruded, a second catching jaw facing the second connection portion, and a second guide unit connecting the second connection portion and the second catching jaw, the second catching jaw being spaced apart from the second side surface of the plate portion, and the plate portion may include a first plate surface, and a second plate surface located opposite to the first plate surface, the first connection portion may be adjacent to the first plate surface, and the second connection portion may be adjacent to the second plate surface.

The support plate may further include a first guide protrusion having a hook-shaped cross-section at a first side surface of the plate portion, and a second guide protrusion having a hook-shaped cross-section at a second side surface of the plate portion extended in a direction crossing the first side surface of the plate portion, and the first guide protrusion and the second guide protrusion may be bent in opposite directions from each other.

According to another embodiment of the present invention, a battery module includes: a plurality of rechargeable batteries; an accommodation member configured to accommodate the rechargeable batteries therein; and a protection module installed in the accommodation member and electrically connected to the rechargeable batteries to control charging and discharging of the rechargeable batteries, and the protection module includes: a plate-shaped plate portion; and a support unit protruded or recessed from the plate portion and coupled to a protection member which controls charging and discharging of a rechargeable battery of the plurality of rechargeable batteries.

The support unit may include a first support unit protruded to extend across the plate portion, a plurality of partitions may be integrally formed in a first wall surface of the first support unit. The first support unit may include first guide ribs separately formed on a top surface of the first support unit and upwardly protruded to accommodate electrical lines.

The support unit may further include a second support unit protruded from the plate portion, and the second support unit may include a first mounting protrusion protruded from the plate portion, a second mounting protrusion protruded from the plate portion and separate from the first mounting protrusion, and a mounting groove between the first mounting protrusion and the second mounting protrusion.

The protection module may further include a second guide rib between the first support unit and the second support unit and separate from a second wall surface of the first support unit to accommodate an electrical line between the second wall surface of the first support unit and the second guide rib. The support unit may include a third support unit recessed from the plate portion.

The protection module may further include a first guide protrusion at a first side surface of the plate portion, the first guide protrusion including a first connection portion externally protruded, and a guide unit bent from the first connection portion. The first guide protrusion may include a plurality of first guide protrusions separately arranged along the first side surface of the plate portion.

The protection module may further include a second guide protrusion at a second side surface of the plate portion extended in a direction crossing the first side surface of the plate portion, the second guide protrusion including a second connection portion externally protruded, and a second guide unit bent from the second connection portion, and the first guide unit and the second guide unit may be bent in opposite directions from each other.

The protection module may further include a first guide protrusion at a first side surface of the plate portion, the first guide protrusion including a first connection portion externally protruded, a first catching jaw facing the first connection portion, and a first guide unit connecting the first connection portion and the first catching jaw.

The protection module may further include a first guide protrusion having a hook-shaped cross-section at a first side surface of the plate portion, and a second guide protrusion having a hook-shaped cross-section at a second side surface of the plate portion extended in a direction crossing the first side surface of the plate portion, and the first guide protrusion and the second guide protrusion may be bent in opposite directions from each other.

According to an aspect of embodiments of the present invention, the support unit is integrally formed in the support plate. Accordingly, an assembly time may be reduced by directly mounting a safety apparatus in the support plate without using an additional bracket, thereby improving productivity. According to another aspect of embodiments of the present invention, electrical lines may be securely supported by forming a plurality of guide protrusions.

DESCRIPTION OF REFERENCE NUMERALS INDICATING SOME ELEMENTS IN THE DRAWINGS

Figure 1:
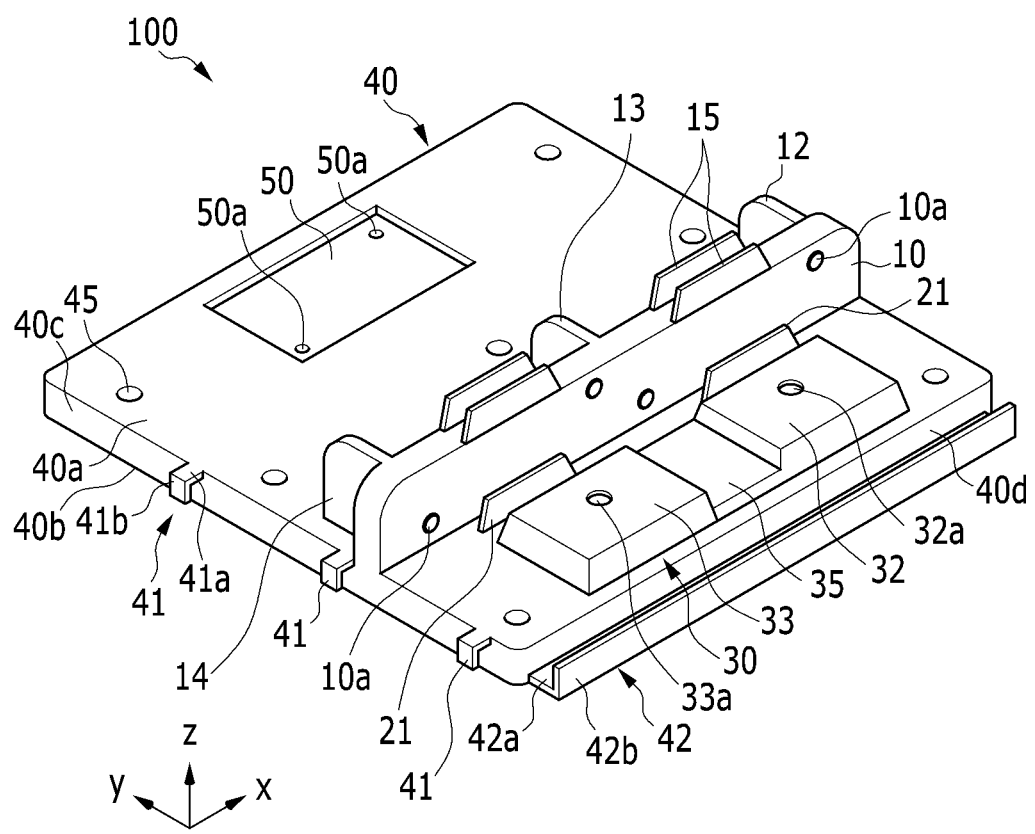
FIG. 1 is a perspective view of a support plate in accordance with an exemplary embodiment of the present invention.

| | |
|---|---|
| 100, 300, 400, 500: support plate | 10: first support unit |
| 12: first partition | 13: second partition |
| 14: third partition | 15: first guide rib |
| 21: second guide rib | 30: second support unit |
| 32: first mounting protrusion | 33: second mounting protrusion |
| 35: mounting groove | 40, 340, 440, 540: plate portion |
| 41, 341, 441, 541: first guide protrusion | |
| 41a, 42a: connection portion | 41b, 42b: guide unit |
| 42, 342, 442, 542: second guide protrusion | |
| 46: first support rib | 47: second support rib |
| 50: third support unit | 72: first protection member |
| 73: second protection member | 74: third protection member |
| 75: fourth protection member | 140: junction box |
| 150: protection module | 200: battery module |

| | |
|---|---|
| 210: rechargeable battery | 220: accommodation member |
| 230: control line | 240: data line |
| 250: connector | |

DETAILED DESCRIPTION

The present invention is described more fully hereinafter with reference to the accompanying drawings, in which some exemplary embodiments of the present invention are shown. As those skilled in the art would realize, the described embodiments may be modified in various different ways, all without departing from the spirit or scope of the present invention. Accordingly, the drawings and description are to be regarded as illustrative in nature and not restrictive. In the drawings and specification, same or like elements are designated by the same reference numerals throughout the specification.

Figure 2:
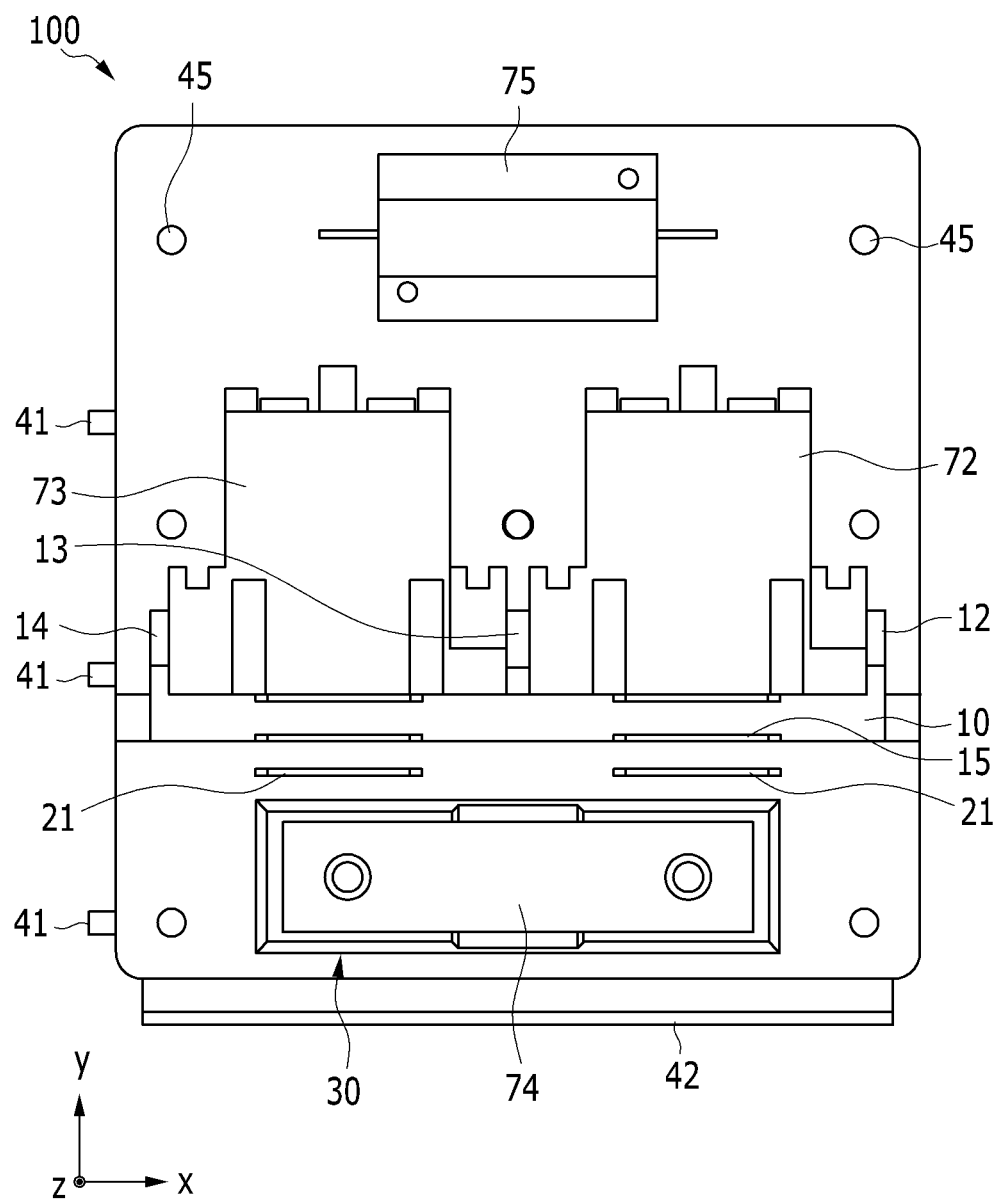
FIG. 2 is a top view of the support plate of FIG. 1 and a safety apparatus mounted therein in accordance with an exemplary embodiment of the present invention.

FIG. 1 is a perspective view of a support plate in accordance with an exemplary embodiment of the present invention; and FIG. 2 is a top view of the support plate of FIG. 1 and a safety apparatus mounted therein in accordance with an exemplary embodiment of the present invention.

Referring to FIG. 1 and FIG. 2, a support plate 100 according to an exemplary embodiment of the present invention includes a plate portion 40, a first support unit 10 protruded from the plate portion 40, a second support unit 30, and a third support unit 50 recessed (e.g., concavely recessed) in the plate portion 40.

The plate portion 40 according to an exemplary embodiment has a quadrangular plate shape, and a plurality of holes 45 facilitating coupling to a protection module 150 (see FIG. 4) are formed in the plate portion 40.

Bolts may be inserted into the holes 45, and serve to fix the support plate 100 to the protection module 150.

The plate portion 40 has an accommodation surface 40a on which one or more protection members may be mounted, and a fixing surface 40b which faces an opposite direction to the accommodation surface 40a and which may be fixed to a support member such as a protection module.

In one exemplary embodiment, the support plate 100 has a quadrangular plate shape, but embodiments of the present invention are not limited thereto.

Alternatively, the support plate 100 may have any other suitable shape, such as a circular plate shape or a triangular plate shape.

The first support unit 10, in one embodiment, is formed to extend across the plate portion 40, and is upwardly protruded from the accommodation surface 40a of the plate portion 40.

The first support unit 10, in one embodiment, is formed to extend from one side of the plate portion 40 to the other side of the plate portion 40 in a width direction.

A plurality of partitions may be formed in the first support unit 10 to protrude vertically with respect to a wall surface of the first support unit 10.

The first support unit 10 is integrally formed with the plate portion 40, and the partitions are integrally formed with the first support unit 10.

The partitions, in one embodiment, include a first partition 12, a second partition 13, and a third partition 14 which are separated from each other in a length direction of the first support unit 10, and a first protection member 72 and a second protection member 73 are respectively provided between the first partition 12 and the second partition 13 and between the second partition 13 and the third partition 14.

The first protection member 72 and the second protection member 73 may be formed of a relay for controlling cut-off of current.

Each of the first protection member 72 and the second protection member 73 is supported at opposite ends thereof by the respective first, second, and third partitions 12, 13, 14 and fixed by allowing a front end thereof to be brought into contact with the first support unit 10. In one embodiment, the first support unit 10 has grooves 10a formed therein to facilitate fixing the first protection member 72 and the second protection member 73 to the first support unit 10, such as using bolts.

A first guide rib 15 is upwardly protruded and formed at an upper end of the first support unit 10 to accommodate an electrical line connected to the first protection member 72 and the second protection member 73.

The first guide rib 15, in one embodiment, includes a pair of first guide ribs 15 which are separately disposed in a thickness direction of the first support unit 10.

The first guide ribs 15 are formed to extend in a length direction of the first support unit 10 to be separately disposed in the length direction of the first support unit 10.

The second support unit 30, in one embodiment, includes a first mounting protrusion 32 protruded from the accommodation surface 40a of the plate portion 40, a second mounting protrusion 33 disposed separately from the first mounting protrusion 32, and a mounting groove 35 formed between the first mounting protrusion 32 and the second mounting protrusion 33.

The first mounting protrusion 32 and the second mounting protrusion 33 are separately disposed in the width direction (e.g., the x-axis direction in FIG. 1) of the plate portion 40, while the mounting groove 35 is interposed therebetween.

A third protection member 74 is provided on the second support unit 30, and grooves 32a and 33a by which the third protection member 74 is fixed are respectively formed in the first mounting protrusion 32 and the second mounting protrusion 33.

Bolts may be installed in the grooves 32a and 33a to facilitate fixing of the third protection member 74.

The third protection member 74 may be formed of a measuring member for measuring voltages and currents of rechargeable batteries.

However, embodiments of the present invention are not limited thereto. Alternatively, the third protection member 74 may be formed of any of various types of devices for controlling and measuring the rechargeable batteries.

A second guide rib 21 is formed between the second support unit 30 and the first support unit 10 and disposed separately from a wall surface of the first support unit 10 to enable an electrical line to be accommodated between the wall surface of the first support unit 10 and the second guide rib 21.

The third support unit 50 is recessed (e.g., concavely recessed), and a fourth protection member 75 is provided in the third support unit 50.

A groove 50a may be formed to extend in the third support unit 50 in a thickness direction of the plate portion 40 to facilitate fixing of the fourth protection member 75.

Bolts may be installed in the groove 50a to securely fix the fourth protection member 75 to the third support unit 50. The fourth protection member 75, in one embodiment, may be formed of a resistor.

A first guide protrusion 41 is formed at a first side surface 40c (e.g., a side surface extended in a y-axis direction in FIG. 1) of the plate portion 40, and has a first connection portion 41a externally extended from the first side surface 40c, and a first guide unit 41b downwardly bent from the first connection portion 41a.

The first connection portion 41a, in one embodiment, is externally protruded from an upper portion of the first side surface 40c adjacent to the accommodation surface 40a of the plate portion 40, and the first guide unit 41b is bent toward the fixing surface 40b.

The first guide protrusion 41, in one embodiment, includes a plurality of first guide protrusions 41 separately arranged in the length direction of the first side surface 40c of the plate portion 40.

Figure 4:
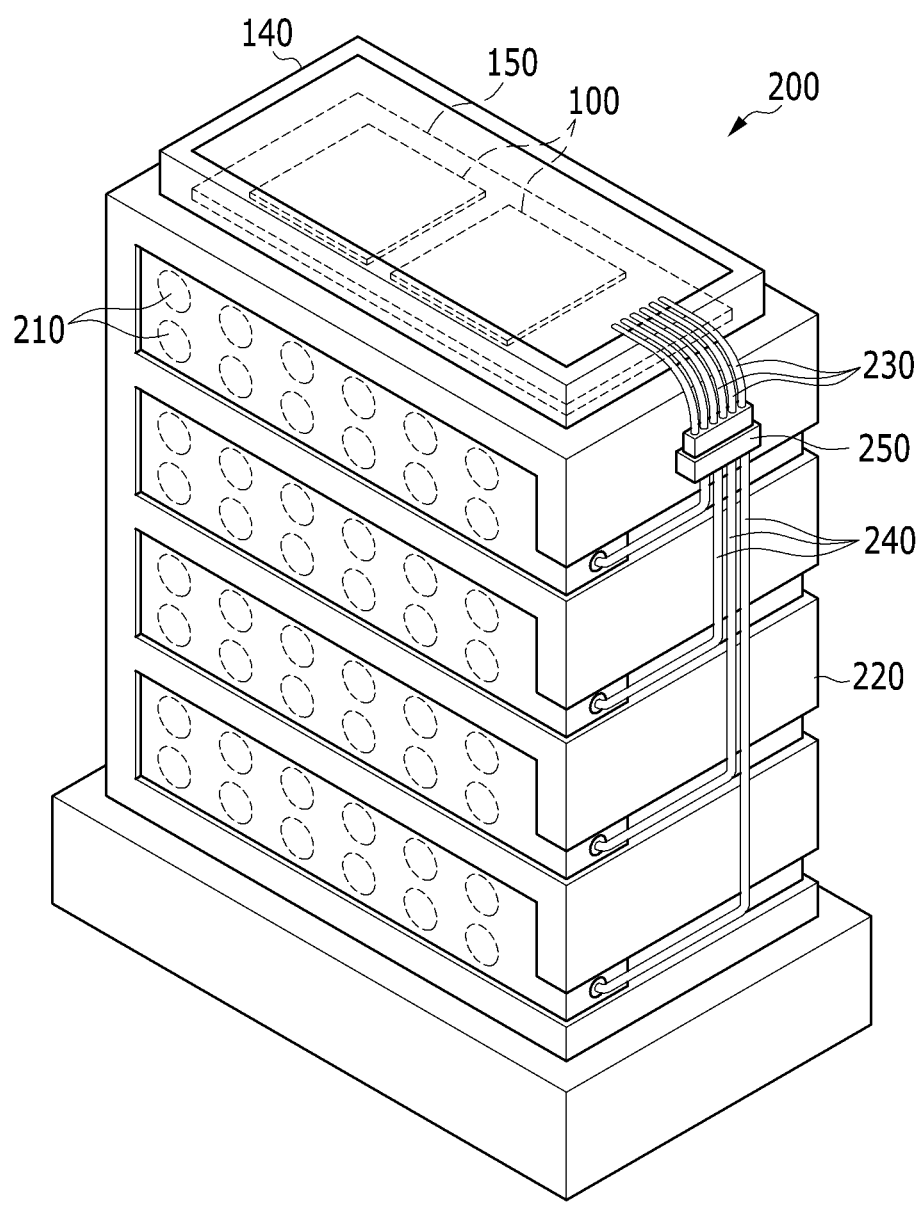
FIG. 4 is a perspective view of a battery module in accordance with an exemplary embodiment of the present invention.

Accordingly, the first guide protrusions 41 can support electrical lines between the accommodation surface 40a and the protection module 150 shown in FIG. 4 to prevent or substantially prevent the electrical lines from being scattered.

A second guide protrusion 42, in one embodiment, is formed at a second side surface 40d (e.g., a side surface extended in the x-axis direction in FIG. 1) of the plate portion 40, adjacent to the second support unit 30.

The second guide protrusion 42, in one embodiment, has a second connection portion 42a externally extended from the second side surface 40d and a second guide unit 42b upwardly bent from the second connection portion 42a. In another embodiment, however, the second guide unit 42b may be downwardly bent from the second connection portion 42a.

The second connection portion 42a, in one embodiment, is externally protruded from a lower portion of the second side surface 40d of the plate portion 40 adjacent to the fixing surface 40b, and the second guide unit 42b is bent toward the accommodation surface 40a.

The second guide protrusion 42 is extended at the second side surface 40d of the plate portion 40 in a direction crossing the first side surface 40c of the plate portion 40.

Further, the second guide protrusion 42 is formed to extend in a length direction of the second side surface 40d of the plate portion 40, and electrical lines may be inserted into the second guide protrusion 42.

In one embodiment, the first guide protrusion 41 and the second guide protrusion 42 are disposed in directions crossing each other, and the first guide unit 41b and the second guide unit 42b are bent in opposite directions from each other to support the electrical lines.

In one embodiment, the first connection portion 41a is disposed adjacent to the accommodation surface 40a, and the first guide unit 41b is bent toward the fixing surface 40b, and the second connection portion 42a is disposed adjacent to the fixing surface 40b, and the second guide unit 42b is bent toward the accommodation surface 40a.

Resultantly, the first guide protrusion 41 may support the electrical lines at a side of the accommodation surface 40a, and the second guide protrusion 42 may support the electrical lines at a side of the fixing surface 40b. Accordingly, the electrical lines can be securely supported in opposite directions without being misaligned.

As described above, in accordance with an exemplary embodiment of the present invention, since the support plate 100 includes a plurality of support units integrally formed with the plate portion 40, it is possible to reduce assembly time by directly supporting one or more of the protection members in the support plate 100 without using an additional bracket, thereby improving productivity.

Further, the guide ribs and the guide protrusions are formed in the support plate 100. Accordingly, it is possible to securely fix the electrical lines connected to the one or more protection members.

Figure 3:
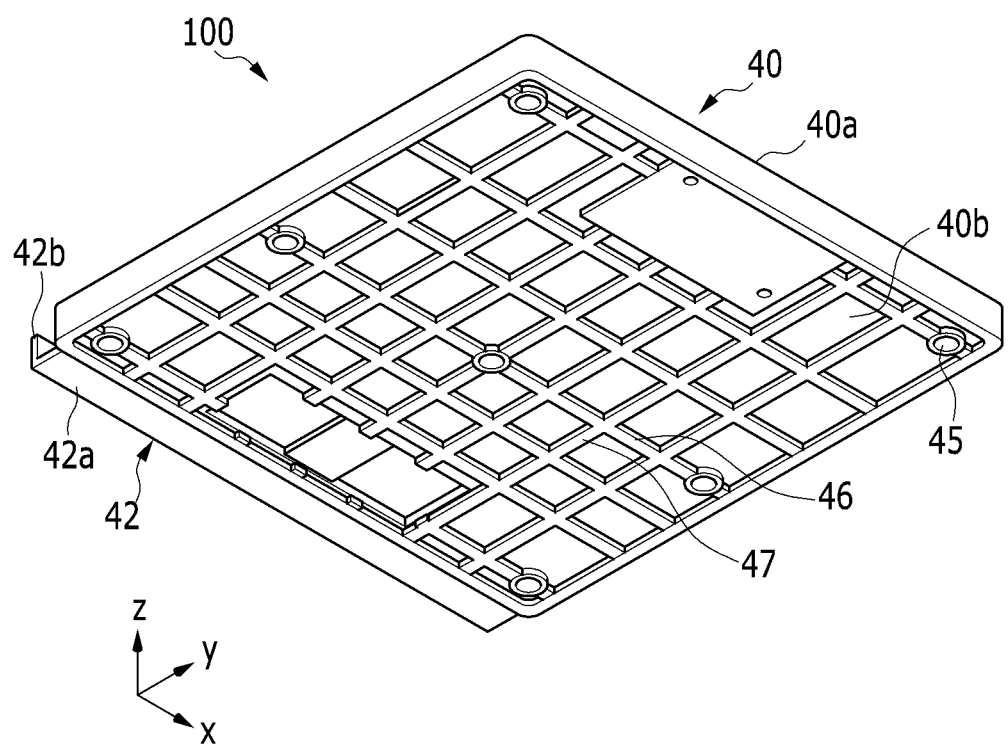
FIG. 3 is a bottom perspective view of the support plate of FIG. 1.

FIG. 3 is a bottom perspective view of the support plate 100.

Referring to FIG. 3, in accordance with an exemplary embodiment of the present invention, the first, second, and third support units 10, 30, 50 are formed in the accommodation surface 40a of the plate portion 40, and support ribs are formed in the fixing surface 40b of the plate portion 40 to improve strength of the support plate 100.

In one embodiment, a first support rib 46 extended in one direction and a second support rib 47 extended in a direction crossing the first support rib 46 are formed in a bottom surface, i.e. the fixing surface 40b, of the plate portion 40.

The first support rib 46 includes a plurality of first support ribs 46 arranged separately in parallel, and the second support rib 47 includes a plurality of second support rib 47 arranged separately in parallel.

The first support ribs 46 and the second support ribs 47 are formed to cross each other in a mesh shape.

As described above, in accordance an exemplary embodiment of the present invention, since the support ribs are formed to improve the strength of the support plate 100, it is possible to prevent damage to the support plate 100 caused by external vibration or impact.

FIG. 4 is a perspective view of a battery module in accordance with an exemplary embodiment of the present invention.

Referring to FIG. 4, a battery module 200 according to an exemplary embodiment of the present invention includes rechargeable batteries 210, an accommodation member 220 which accommodates the rechargeable batteries 210 therein, and a junction box 140 electrically connected to the rechargeable batteries 210 and fixed to the accommodation member 220.

Each of the rechargeable batteries 210 according to one exemplary embodiment includes a cylindrical case, an electrode assembly inserted into the case and including a positive electrode and a negative electrode, and a cap plate coupled to the case.

The rechargeable battery, in one embodiment, has a cylindrical shape, as described herein; however, embodiments of the present invention are not limited thereto.

Alternatively, the rechargeable battery may have a polygonal shape or the like.

Each of the rechargeable batteries 210 may be connected to an adjacent one of the rechargeable batteries 210 in series or in parallel through a bus bar.

The rechargeable batteries 210 are fixed within the accommodation member 220. The accommodation member 220 may be formed in a frame shape so as to fix the rechargeable batteries 210.

However, the present invention is not limited thereto. Alternatively, the accommodation member 220 may have a case shape.

The junction box 140 into which the protection module 150 is inserted may be provided at an upper portion of the accommodation member 220.

In one embodiment, the junction box 140 is provided at the upper portion of the accommodation member 220, but the present invention is not limited thereto.

Alternatively, the accommodation member may be provided at a side or lower portion of the accommodation member 220.

A protection member for controlling and measuring charging and discharging of the rechargeable batteries 210 is mounted in the protection module 150.

As described above, the protection member is mounted on the protection module 150 through the support plate 100. A plurality of support plates 100 may be mounted in the protection module 150.

A control line 230 connected to the protection module 150 is installed in the junction box 140, and a data line 240 is connected to the rechargeable batteries 210.

The control line 230 and the data line 240 are connected to each other by a connector 250.

The control line 230 is connected to the data line 240 to serve to transfer information related to voltages, currents, and temperatures of the rechargeable batteries 210 to the protection module 150.

Figure 5:
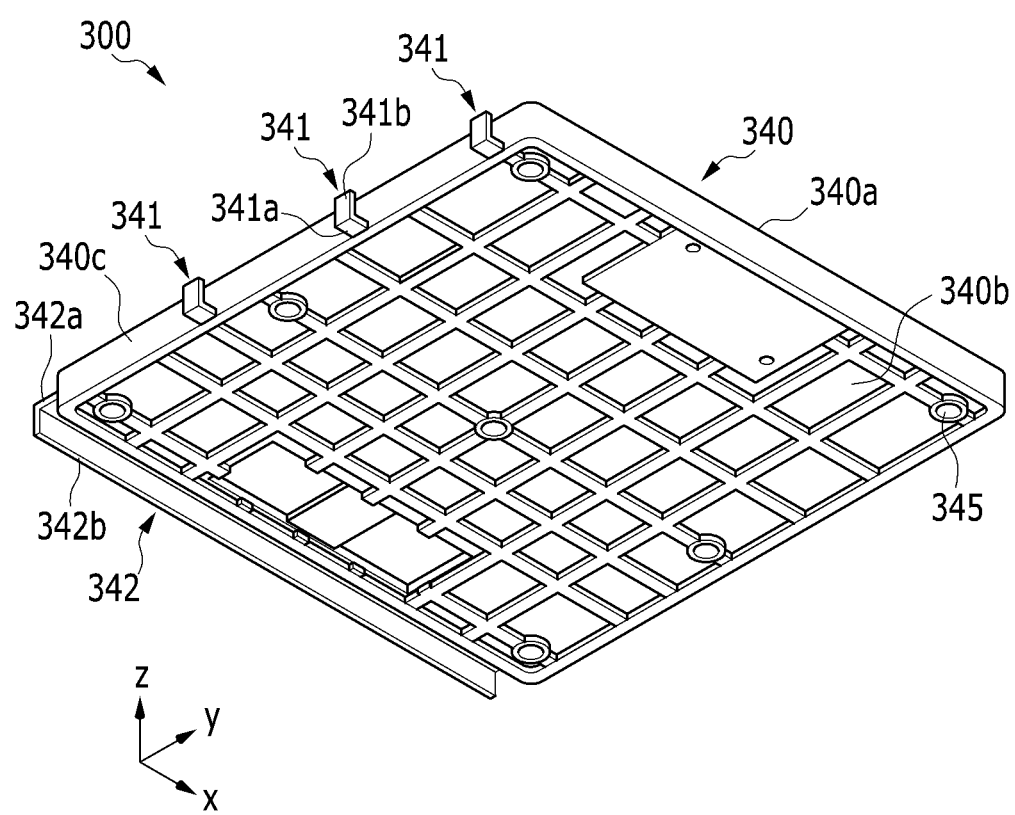
FIG. 5 is a bottom perspective view of a support plate in accordance with another exemplary embodiment of the present invention.

FIG. 5 is a bottom perspective view of a support plate in accordance with another exemplary embodiment of the present invention.

Referring to FIG. 5, a support plate 300 according to another exemplary embodiment of the present invention has a same structure as that of the support plate 100 described above except for a structure of guide protrusions. Accordingly, repeated description of same structures and aspects thereof will be omitted.

The support plate 300 according to another exemplary embodiment of the present invention has a plate portion 340 and one or more protection members may be fixed to the plate portion 340.

The plate portion 340, in one embodiment, has a quadrangular plate shape, and a plurality of holes 345 are formed in the plate portion 340.

Bolts may be installed within the holes 345, and the bolts serve to fix the support plate 300 to the protection module.

The plate portion 340 has an accommodation surface 340a on which the protection members may be mounted, and a fixing surface 340b which faces an opposite direction to the accommodation surface 340a and which may be fixed to a support member such as a protection module.

A first guide protrusion 341 is formed at a side surface 340c of the plate portion 340, and has a first connection portion 341a externally protruded from the side surface 340c of the plate portion 340 and a first guide unit 341b upwardly bent from the first connection portion 341a.

The first connection portion 341a, in one embodiment, is externally protruded from a lower portion of the side surface 340c adjacent to the fixing surface 340b of the plate portion 340, and the first guide unit 341b is bent toward the accommodation surface 340a.

The first guide protrusion 341, in one embodiment, includes a plurality of first guide protrusions 341 separately arranged in the length direction of the side surface 340c of the plate portion 340.

Accordingly, the first guide protrusions 341 can support electrical lines to prevent or substantially prevent the electrical lines from being scattered.

A second guide protrusion 342 is formed at another side surface of the plate portion 340 extended in a direction crossing the side surface 341c on which the first guide protrusion 341 is formed.

The second guide protrusion 342 has a second connection portion 342a externally protruded from the another side surface of the plate portion 340, and a second guide unit 342b bent downwardly from the second connection portion 342a.

The second connection portion 342a, in one embodiment, is externally protruded from an upper portion of the another side surface of the plate portion 340 adjacent to the accommodation surface 340a of the plate portion 340, and the second guide unit 342b is bent toward the fixing surface 340b from the second connection portion 342a.

The second guide protrusion 342 is formed to extend along the another side surface of the plate portion 340, and electrical lines may be inserted into the second guide protrusion 342.

In one embodiment, the first guide protrusion 341 and the second guide protrusion 342 are disposed in directions crossing each other, and the first guide unit 341b and the second guide unit 342b are bent in opposite directions from each other to support the electrical lines.

The first connection portion 341a is disposed adjacent to the fixing surface 340b, and the first guide unit 341b is bent toward the accommodation surface 340a.

The second connection portion 342a is disposed adjacent to the accommodation surface 340a, and the second guide unit 342b is bent toward the fixing surface 340b.

Resultantly, the first guide protrusion 341 supports the electrical lines at a side of the fixing surface 340b, and the second guide protrusion 342 supports the electrical lines at a side of the accommodation surface 340a.

Accordingly, the electrical lines can be securely supported in opposite directions without being dropped out.

Figure 6:
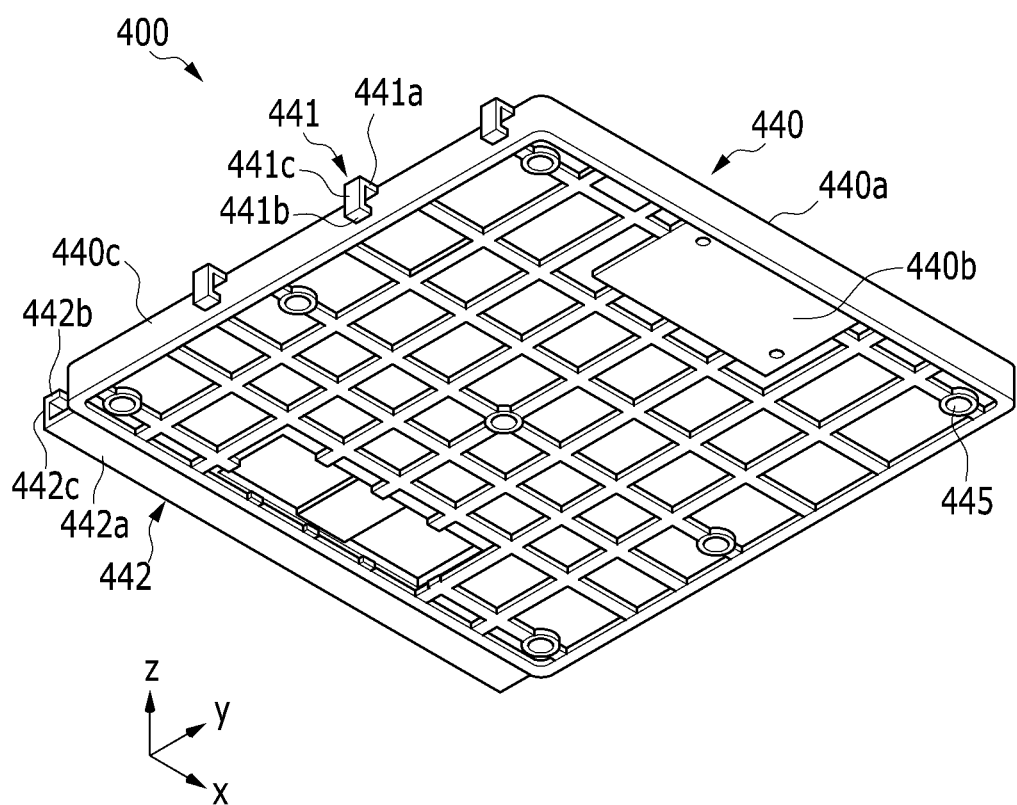
FIG. 6 is a bottom perspective view of a support plate in accordance with another exemplary embodiment of the present invention.
Figure 7:
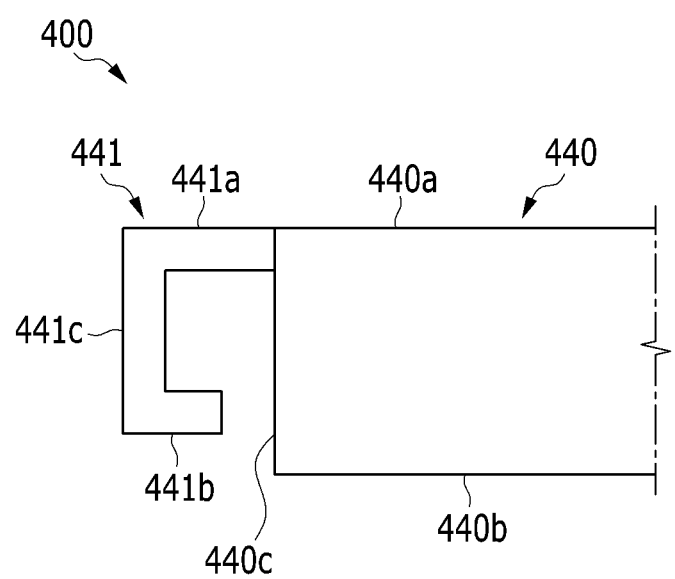
FIG. 7 is a partial side view of the support plate of FIG. 6.

FIG. 6 is a bottom perspective view of a support plate in accordance with another exemplary embodiment of the present invention; and FIG. 7 is a partial side view of the support plate of FIG. 6.

Referring to FIG. 6 and FIG. 7, a support plate 400 according to another exemplary embodiment of the present invention has a same structure as that of the support plate 100 described above except for a structure of guide protrusions. Accordingly, repeated description of same structures and aspects thereof will be omitted.

The support plate 400 according to another exemplary embodiment of the present invention has a plate portion 440 and one or more protection members may be fixed to the plate portion 440.

The plate portion 440, in one embodiment, has a quadrangular plate shape, and a plurality of holes 445 are formed in the plate portion 440.

Bolts may be installed within the holes 445, and the bolts serve to fix the support plate 400 to the protection module.

The plate portion 440 has an accommodation surface 440a on which the protection members may be mounted, and a fixing surface 440b which faces an opposite direction to the accommodation surface 440a and which may be fixed to a support member such as a protection module.

A first guide protrusion 441 is formed at a side surface 440c of the plate portion 440, and has a first connection portion 441a externally protruded from the side surface 440c of the plate portion 440, a first catching jaw 441b formed to face the first connection portion 441a, and a first guide unit 441c connecting the first connection portion 441a with the first catching jaw 441b.

The first connection portion 441a, in one embodiment, is externally protruded from an upper end of the side surface 440c of the plate portion 440 to be adjacent to the accommodation surface 440a of the plate portion 440, and the first catching jaw 441b is disposed adjacent to the fixing surface 440b.

The first catching jaw 441b is disposed separately, or spaced apart, from the side surface 440c of the plate portion 440.

Accordingly, electrical lines may be inserted into a space between the first catching jaw 441b and the side surface 440c of the plate portion 440.

The inserted electrical lines are supported by the first catching jaw 441b to prevent or substantially prevent disconnection of the electrical lines from the first guide protrusion 441.

The first guide protrusion 441, in one embodiment, includes a plurality of first guide protrusions 441 separately arranged along the side surface 440c of the plate portion 440.

Accordingly, the first guide protrusions 441 can support the electrical lines to prevent or substantially prevent the electrical lines from being scattered.

A second guide protrusion 442 is formed at another side surface of the plate portion 440 extended in a direction crossing the side surface 440c of the plate portion 440 on which the first guide protrusion 441 is formed.

The second guide protrusion 442 has a second connection portion 442a externally protruded from the another side surface 440c of the plate portion 440, a second catching jaw 442b formed to face the second connection portion 442a, and a second guide unit 442c connecting the second connection portion 442a with the second catching jaw 442b.

The second connection portion 442a, in one embodiment, is externally protruded from a lower end of the another side surface of the plate portion 440 adjacent to the fixing surface 440b thereof, and the second guide unit 442b is disposed adjacent to the accommodation surface 440a.

The second catching jaw 442b is disposed separately, or spaced apart, from the another side surface of the plate portion 440.

Accordingly, electrical lines can be inserted into a space between the second catching jaw 442b and the another side surface of the plate portion 440. However, embodiments of the present invention are not limited to the above-described arrangement of the first guide protrusion 441 and the second guide protrusion 442. For example, in another embodiment, the first guide protrusion 441 may be bent in an upward direction toward the accommodation surface 440a, and the second guide protrusion 442 may be bent in a downward direction toward the fixing surface 440b.

With the described structure, the first connection portion 441a and the second connection portion 442a are disposed in opposite directions from each other with respect to the thickness direction of the plate portion 440 to support the electrical lines.

Accordingly, the electrical lines can be supported securely without being dropped out from the first catching jaw 441b or the second catching jaw 442b.

Figure 8:
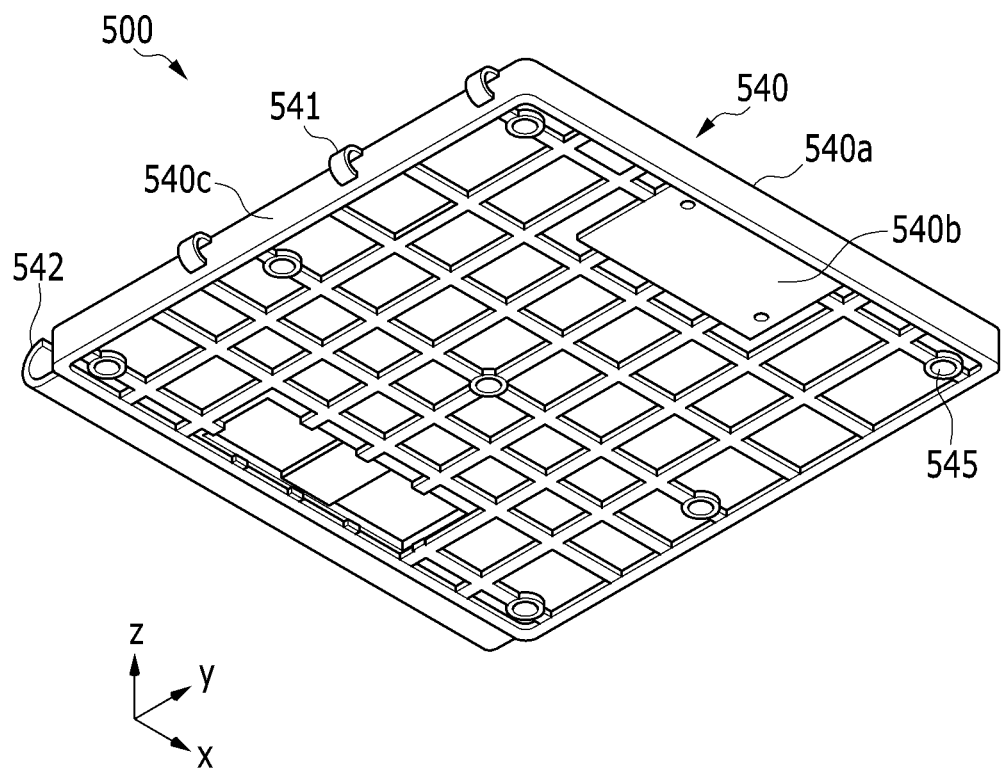
FIG. 8 is a bottom perspective view of a support plate in accordance with another exemplary embodiment of the present invention.

FIG. 8 is a bottom perspective view of a support plate in accordance with another exemplary embodiment of the present invention.

Referring to FIG. 8, a support plate 500 according to another exemplary embodiment of the present invention has a same structure as that of the support plate 100 described above except for a structure of guide protrusions. Accordingly, repeated description of same structures and aspects thereof will be omitted.

The support plate 500 according to another exemplary embodiment of the present invention has a plate portion 540 and one or more protection members may be fixed to the plate portion 540.

The plate portion 540, in one embodiment, has a quadrangular plate shape with a thickness, and a plurality of holes 545 are formed in the plate portion 540. Bolts may be installed within the holes 545, and the bolts serve to fix the support plate 500 to the protection module.

The plate portion 540 has an accommodation surface 540a on which the protection members may be mounted, and a fixing surface 540b which faces an opposite direction to the accommodation surface 540a and which may be fixed to a support member such as a protection module.

A first guide protrusion 541 is formed at a side surface 540c of the plate portion 540.

The first guide protrusion 541 is externally protruded from the side surface 540c of the plate portion 540 to be bent, forming a hook-shaped cross-section.

The first guide protrusion 541, in one embodiment, is externally protruded from an upper end of the side surface 540c of the plate portion 540 adjacent to the accommodation surface 540a of the plate portion 540, and a front end of the first guide protrusion 541 is downwardly bent to be adjacent to the fixing surface 540b of the plate portion 540.

The front end of the first guide protrusion 541 is separated, or spaced apart, from the side surface 540c of the plate portion 540 such that a space is formed therebetween into which electrical lines can be inserted between the front end of the first guide protrusion 541 and the side surface 540c of the plate portion 540.

The first guide protrusion 541, in one embodiment, includes a plurality of first guide protrusions 541 separately arranged along the side surface 540c of the plate portion 540. Accordingly, the first guide protrusions 541 can support the electrical lines to prevent or substantially prevent the electrical lines from being scattered.

A second guide protrusion 542 is formed at another side surface of the plate portion 540 extended in a direction crossing the side surface 540c of the plate portion 540 on which the first guide protrusion 541 is formed.

The second guide protrusion 542 is externally protruded from the another side surface of the plate portion 540 to be bent, forming a hook-shaped cross-section. The second guide protrusion 542, in one embodiment, is externally protruded from a lower end of the plate portion 540 adjacent to the fixing surface 540b of the plate portion 540, and a front end of the second guide protrusion 542 is bent toward an upper portion of the plate portion 540 to be adjacent to the accommodation surface 540a. The front end of the second guide protrusion 542 is separated, or spaced apart, from the another side surface of the plate portion 540 such that a space is formed therebetween into which the electrical lines can be inserted between the front end of the second guide protrusion 542 and the another side surface of the plate portion 540. However, embodiments of the present invention are not limited to the above-described arrangement of the first guide protrusion 541 and the second guide protrusion 542. For example, in another embodiment, the first guide protrusion 541 may be bent in an upward direction toward the accommodation surface 540a, and the second guide protrusion 542 may be bent in a downward direction toward the fixing surface 540b.

As such, the first guide protrusion 541 and the second guide protrusion 542 are disposed in opposite directions to each other with respect to the thickness direction of the plate portion 540 to support the electrical lines. Accordingly, the electrical lines can be supported securely without being dropped out from the first guide protrusion 541 or the second guide protrusion 542.

While the present invention has been described in connection with certain exemplary embodiments, it is to be understood that the invention is not limited to the disclosed embodiments. Accordingly, it will be understood by those of skill in the art that various changes in form and details may be made without departing from the spirit and scope of the present invention as set forth in the following claims and equivalents thereof.

What is claimed is:

1. A support plate for a protection module of a battery module, the support plate comprising:
   a plate-shaped plate portion; and
   a support unit protruded or recessed from the plate portion and coupled to a plurality of protection members configured to control charging and discharging of a rechargeable battery,
   wherein the plate portion and the support unit are integrally formed,
   wherein the support unit comprises a first support unit protruded from the plate portion, first and second protection members of the plurality of protection members contacting a first wall surface of the first support unit, and a second partition integrally formed in the first wall surface of the first support unit and extending between the first and second protection members, wherein the first wall surface faces toward a first direction, and the second partition extends from the first wall surface in the first direction,
   wherein the plate portion extends away from the first wall surface in the first direction so as to extend under the first and second protection members, the first and second protection members being mounted on and overlapping a region of the plate portion that extends under the first and second protection members, and
   wherein the support unit further comprises a second support unit protruded from the plate portion, and a third protection member of the plurality of protection members is supported on the second support unit.

2. The support plate of claim 1, wherein the first support unit has a groove by which the first protection member of the plurality of protection members is fixed to the support unit.

3. The support plate of claim 2, wherein the first support unit is protruded to extend across the plate portion, and a plurality of partitions including the second partition is integrally formed in the first wall surface of the first support unit.

4. A support plate for a protection module of a battery module, the support plate comprising:
   a plate-shaped plate portion; and
   a support unit protruded or recessed from the plate portion and coupled to a plurality of protection members configured to control charging and discharging of a rechargeable battery,
   wherein the plate portion and the support unit are integrally formed,
   wherein the support unit comprises a first support unit protruded from the plate portion, first and second protection members of the plurality of protection members contacting a first wall surface of the first support unit, and a second partition integrally formed in the first wall surface of the first support unit and extending between the first and second protection members, wherein the first wall surface faces toward a first direction, and the second partition extends from the first wall surface in the first direction,
   wherein the plate portion extends away from the first wall surface in the first direction so as to extend under the first and second protection members, the first and second protection members being mounted on and overlapping a region of the plate portion that extends under the first and second protection members, and
   wherein the first support unit comprises guide ribs separately formed on a top surface of the first support unit and upwardly protruded to accommodate electrical lines.

5. The support plate of claim 3, wherein the second support unit includes a first mounting protrusion protruded from the plate portion, a second mounting protrusion protruded from the plate portion and separate from the first mounting protrusion, and a mounting groove between the first mounting protrusion and the second mounting protrusion.

6. A support plate for a protection module of a battery module, the support plate comprising:
   a plate-shaped plate portion; and
   a support unit protruded or recessed from the plate portion and coupled to a plurality of protection members configured to control charging and discharging of a rechargeable battery,
   wherein the plate portion and the support unit are integrally formed,
   wherein the support unit comprises a first support unit protruded from the plate portion, first and second protection members of the plurality of protection members contacting a first wall surface of the first support unit, and a second partition integrally formed in the first wall surface of the first support unit and extending between the first and second protection members, wherein the first wall surface faces toward a first direction, and the second partition extends from the first wall surface in the first direction,
   wherein the plate portion extends away from the first wall surface in the first direction so as to extend under the first and second protection members, the first and second protection members being mounted on and overlapping a region of the plate portion that extends under the first and second protection members,
   wherein the support unit further comprises a second support unit protruded from the plate portion and supporting a third protection member of the plurality of protection members, and
   wherein the support plate further comprises a second guide rib between the first support unit and the second support unit and separate from a second wall surface of the first support unit to accommodate an electrical line between the second wall surface of the first support unit and the second guide rib.

7. The support plate of claim 1, wherein the support unit includes a third support unit recessed from the plate portion.

8. The support plate of claim 1, further comprising a first guide protrusion at a first side surface of the plate portion, the first guide protrusion comprising a first connection portion externally protruded, and a guide unit bent from the first connection portion.

9. The support plate of claim 8, wherein the first guide protrusion comprises a plurality of first guide protrusions separately arranged along the first side surface of the plate portion.

10. The support plate of claim 1, further comprising a first guide protrusion at a first side surface of the plate portion, the first guide protrusion comprising a first connection portion externally protruded, a first catching jaw facing the first connection portion, and a first guide unit connecting the first connection portion and the first catching jaw.

11. The support plate of claim 10, wherein the first catching jaw is spaced apart from the first side surface of the plate portion to form a space between the first catching jaw and the first side surface.

12. A battery module comprising:
a plurality of rechargeable batteries;
an accommodation member configured to accommodate the rechargeable batteries therein; and
a protection module configured to be installed in the accommodation member and electrically connected to the rechargeable batteries to control charging and discharging of the rechargeable batteries,
wherein the protection module comprises:
a plate-shaped plate portion; and
a support unit protruded or recessed from the plate portion and coupled to a plurality of protection members which controls charging and discharging of a rechargeable battery of the plurality of rechargeable batteries,
wherein the support unit comprises a first support unit protruded from the plate portion, first and second protection members of the plurality of protection members contacting a first wall surface of the first support unit, and a second partition integrally formed in the first wall surface of the first support unit and extending between the first and second protection members, wherein the first wall surface faces toward a first direction, and the second partition extends from the first wall surface in the first direction,
wherein the plate portion extends away from the first wall surface in the first direction so as to extend under the first and second protection members, the first and second protection members being mounted on and overlapping a region of the plate portion that extends under the first and second protection members, and
wherein the support unit further comprises a second support unit protruded from the plate portion, and a third protection member of the plurality of protection members is supported on the second support unit.

13. The battery module of claim 12, wherein the first support unit is protruded to extend across the plate portion and support the first and second protection members of the plurality of protection members, and a plurality of partitions including the second partition is integrally formed in the first wall surface of the first support unit.

14. The battery module of claim 13, wherein the first support unit comprises first guide ribs separately formed on a top surface of the first support unit and upwardly protruded to accommodate electrical lines.

15. The battery module of claim 13, wherein the second support unit includes a first mounting protrusion protruded from the plate portion, a second mounting protrusion protruded from the plate portion and separate from the first mounting protrusion, and a mounting groove between the first mounting protrusion and the second mounting protrusion.

16. The battery module of claim 15, wherein the protection module further comprises a second guide rib between the first support unit and the second support unit and separate from a second wall surface of the first support unit to accommodate an electrical line between the second wall surface of the first support unit and the second guide rib.

17. The battery module of claim 16, wherein the support unit includes a third support unit recessed from the plate portion.

18. The battery module of claim 12, wherein the protection module further comprises a first guide protrusion at a first side surface of the plate portion, the first guide protrusion comprising a first connection portion externally protruded, and a guide unit bent from the first connection portion.

19. The battery module of claim 18, wherein the first guide protrusion comprises a plurality of first guide protrusions separately arranged along the first side surface of the plate portion.

20. The battery module of claim 12, wherein the protection module further comprises a first guide protrusion at a first side surface of the plate portion, the first guide protrusion comprising a first connection portion externally protruded, a first catching jaw facing the first connection portion, and a first guide unit connecting the first connection portion and the first catching jaw.

* * * * *